Jan. 25, 1938. M. L. PINSON 2,106,652
LOAD INDICATOR DEVICE
Filed June 2, 1937
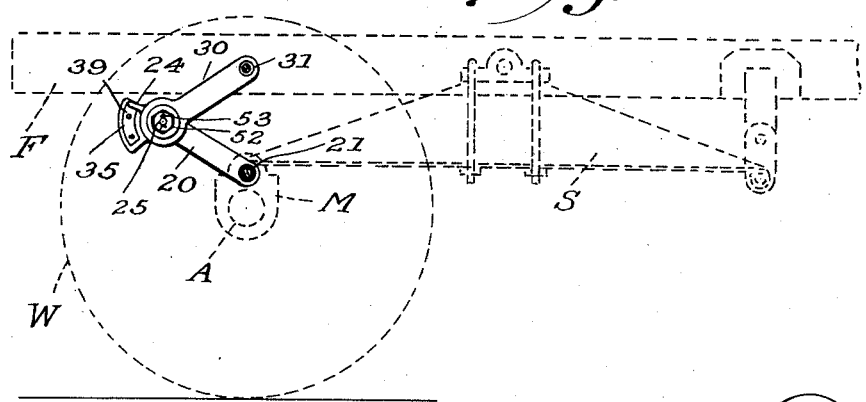
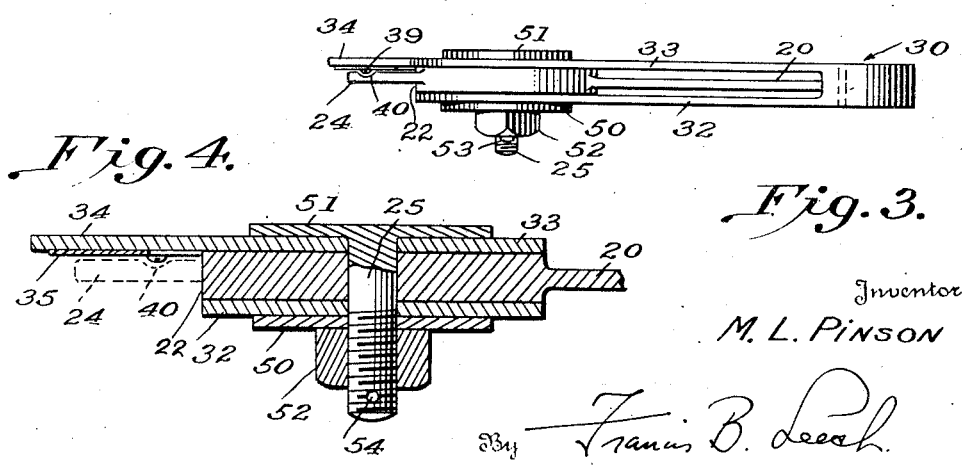
Inventor
M. L. PINSON
By Francis B. Leach
Attorney Patented Jan. 25, 1938

2,106,652

UNITED STATES PATENT OFFICE 2,106,652

LOAD INDICATOR DEVICE

Martin L. Pinson, Phoenix, Ariz., assignor of one-half to Rap A. Pinson, Charlotte, Mich.

Application June 2, 1937, Serial No. 146,127

3 Claims. (Cl. 265—40)

This invention relates to devices for measuring the weight of the load imposed upon a vehicle or machine and is herein illustrated as embodied in an apparatus for measuring and indicating the load carried by an automobile truck or trailer.

In order to avoid the overloading of trucks and similar vehicles, to insure compliance with laws pertaining to the loading thereof, and to provide an approximate measure of the net and tare load for other commonly recognized purposes, the use of a convenient measuring means has become desirable. I have made certain improvements in load indicators which are described in the following parts of my specification.

According to one feature of the present invention, there is provided a pair of pivotally connected arms, one of which is extended slightly beyond the point of connection to serve as an indicating pointer or finger, and the other of which is similarly extended, but enlarged also to carry a scale for measuring the load.

Another feature of the invention resides in an adjustable mounting for the scale, which in turn is calibrated to read in several different units.

These and other features of the invention including certain details of construction and combinations of parts will be described as embodied in an illustrative device and pointed out in the appended claims.

Referring to the accompanying drawing:

Fig. 1 is a side elevation of a vehicle, shown in dotted lines, to which my indicator has been operatively connected;

Fig. 2 is an elevation of my indicator, representing an unloaded position with the pointer on zero;

Fig. 3 is a top plan view of the indicator shown in Fig. 2;

Fig. 4 is a fragmentary cross section taken on the line 4—4 of Fig. 2 and showing certain construction details on an enlarged scale;

Fig. 5 is an elevation of the indicator scale showing the graduated face thereof, and somewhat enlarged.

As shown best in Fig. 2 my load indicator comprises essentially a pointer arm 20 and a scale arm 30, pivotally connected at one end of each by a bolt 25.

At its point of connection the arm 20 is formed with an enlarged end 22 (Fig. 4) which has an integral indicating finger or pointer 24 extending therefrom a short distance past the point of connection. The arm 20 has a bushed bolt-eye 21 at its other end, by means of which it may be attached to a vehicle or machine. A similar bushed bolt-eye 31 is provided on the arm 30.

In Fig. 3 is shown the bifurcated nature of the scale arm 30. The arm 20 is pivotally mounted between a bifurcation 32 and another bifurcation 33. The bifurcation 33 of the arm 30 is extended beyond its pivotal connection at bolt 25, given the arcuate shape of a segmental plate 34, and arranged concentrically with respect to the axis of bolt 25, which is also the axis of rotation for the pointer 24.

The arrangement is that of a pair of pivotally connected cross arms.

The pivotal connection at bolt 25 (Fig. 4) includes a washer 50, a nut 52, and a cotter pin 53. The bolt 25 is formed with a large, relatively thin, round plate 51 as a head and is provided with a pin 53 which retains the nut 52.

Mounted on the arcuate plate 34 of arm 30 is a similarly shaped but slightly smaller scale plate 35, best illustrated by Fig. 5. Machine screws 37 and 39 passing through arcuate slots 36 and 38, respectively, of the scale plate 35 adjustably connect it to the segmental plate 34 on the end of arm 30. The arcuate slots 36, 38 and the several scales, (the inner and outer of which are marked N and T respectively) are concentric with respect to the axis of bolt 25; therefore the adjusting movement of scale plate 35 will be about said axis. This adjustment permits a positioning of the pointer 24 at 0 (zero) after physical changes in the vehicle or machine have shifted the no-load position of the arms 20 and 30.

A rounded groove 40 (Fig. 4) across the face of pointer 24 which is next to the scale plate 35 affords clearance for the heads of screws 37 and 39.

The operation of my load indicator can be readily understood from an explanation of its application to the vehicle indicated by dotted lines in Fig. 1. In this figure the scale carrying arm 30 has its free end pivotally connected to a truck frame F and the indicator or pointer arm 20 has its free end pivotally connected to a fixture M which is rigidly mounted on an axle A of a wheel W. If convenient, the fixture M may serve also to connect one end of a leaf spring S to the axle A. The pivots of arms 30 and 20 are arranged in vertical alignment with each other and with the vertical diameters of the wheel W. Depression of the frame F under load will reduce the vertical distance between the separately pivoted ends of arms 30 and 20, thus causing the pointer 24 to move downwardly over scale 35 from 0 (zero) to a position corresponding to the load imposed. It will be seen that my device measures at all times the vertical distance between the vehicle body or frame F of the truck and its axle A.

Having described my invention, what I claim as new and desire to secure by Letters Patent of the United States is:

1. A load indicator for vehicles including a pair of arms pivotally connected adjacent their ends, one of said arms being bifurcated and carrying a suitable scale on a bifurcation beyond its pivot point, the other of said arms, which is mounted between the bifurcations, being continuous and having a pointer extending beyond its pivot point, and bearing means on the opposite ends of said arms for attaching to the axle and frame of a vehicle.

2. A load indicator for measuring the distance between the body and axle of a vehicle comprising a pair of pivotally connected cross arms adapted to be secured by a pair of their ends to the body and axle of the vehicle, a pointer arm extending from the opposite end of one of said pivoted cross arms, and a load indicating scale carried adjustably on an arcuate plate formed on the end of the other of said pivotally connected cross arms, said other cross-arm having bifurcations at its scale end which lie on either side of the pointer arm.

3. A vehicle load indicating device for measuring the distance between the body and the axle of a vehicle including a pair of crossed arms, one of said arms being bifurcated, an arcuate plate formed on an end of one of the bifurcations, the other of said arms comprising a continuous member extending between the bifurcations and having a pointer formed on one end, means for pivotally connecting the bifurcated and continuous members, and a scale affixed to the said arcuate plate and cooperating with the said pointer for measuring at all times the distance between the body and the axle, the opposite ends of said crossed arms each having an opening formed therein so that it may be pivotally secured to the body or axle.

MARTIN L. PINSON.